(12) United States Patent
Zhang et al.

(10) Patent No.: US 11,987,660 B2
(45) Date of Patent: May 21, 2024

(54) CATALYTIC SYSTEM AND USE THEREOF, AND PREPARATION METHOD OF SYNDIOTACTIC 1,2-POLYBUTADIENE (S-PB)

(71) Applicant: Qingdao University of Science & Technology, Qingdao (CN)

(72) Inventors: Chunyu Zhang, Qingdao (CN); Lihua Na, Qingdao (CN); Qi Yang, Qingdao (CN); Heng Liu, Qingdao (CN); Xuequan Zhang, Qingdao (CN)

(73) Assignee: Qingdao University of Science & Technology, Qingdao (CN)

( * ) Notice: Subject to any disclaimer, the term of this patent is extended or adjusted under 35 U.S.C. 154(b) by 0 days.

(21) Appl. No.: 18/080,175

(22) Filed: Dec. 13, 2022

(65) Prior Publication Data

US 2023/0192912 A1 Jun. 22, 2023

(51) Int. Cl.
*C08F 4/70* (2006.01)
*C08F 4/04* (2006.01)
*C08F 4/602* (2006.01)
*C08F 36/06* (2006.01)
*C08F 136/06* (2006.01)

(52) U.S. Cl.
CPC .................. *C08F 4/70* (2013.01); *C08F 4/04* (2013.01); *C08F 4/602* (2013.01); *C08F 36/06* (2013.01); *C08F 136/06* (2013.01)

(58) Field of Classification Search
CPC .... C08F 4/70; C08F 4/04; C08F 4/602; C08F 36/06; C08F 136/06
See application file for complete search history.

(56) References Cited

FOREIGN PATENT DOCUMENTS

WO       WO-2013053046 A1 *  4/2013  .......... B01J 31/2243

* cited by examiner

*Primary Examiner* — Catherine S Branch
(74) *Attorney, Agent, or Firm* — Neugeboren O'Dowd PC (57) ABSTRACT

The present disclosure relates to the technical field of preparation of syndiotactic 1,2-polybutadiene (s-PB), in particular to a catalytic system and use thereof, and a preparation method of s-PB. In the present disclosure, the catalytic system includes an iron-containing organic compound, an azodicyano compound, an organoaluminum compound, and a free radical scavenger; where an iron element in the iron-containing organic compound, the azodicyano compound, the organoaluminum compound, and the free radical scavenger have a molar ratio of 1:(0.5-10):(5-100):(1-1000); and the free radical scavenger is selected from the group consisting of a sterically hindered phenol, a sterically hindered amine, and a phosphorus-containing antioxidant. The catalytic system can prepare the s-PB with a high activity at a high temperature, and the s-PB has a melting point of 60° C. to 130° C. with an extremely low gel content or even no gelation.

15 Claims, 4 Drawing Sheets

CATALYTIC SYSTEM AND USE THEREOF, AND PREPARATION METHOD OF SYNDIOTACTIC 1,2-POLYBUTADIENE (S-PB)

CROSS REFERENCE TO RELATED APPLICATION

This patent application claims the benefit and priority of Chinese Patent Application No. 202111573496.8, filed with the China National Intellectual Property Administration on Dec. 21, 2021, the disclosure of which is incorporated by reference herein in its entirety as part of the present application.

TECHNICAL FIELD

The present disclosure relates to the technical field of preparation of syndiotactic 1,2-polybutadiene (s-PB), in particular to a catalytic system and use thereof, and a preparation method of s-PB.

BACKGROUND

Syndiotactic 1,2-polybutadiene (s-PB) elastomers were first prepared by JSR Corporation in 1966 using a cobalt-based catalyst ($CoX_2$—$AlR_3$—$H_2O/Ph_3P$), and then industrialized in 1974. In the 1970s, UBE Corporation of Japan developed another cobalt-based catalyst ($Co(acac)_3$-$AlEt_3$-$CS_2$) to prepare the s-PB elastomers, which also achieved industrial production. However, in the above preparation processes, toxic substances such as carbon disulfide and aromatic hydrocarbons or halogenated hydrocarbons with pungent odor are required, posing a great threat to the environment and personal safety, and also increasing a production cost.

In response to the above problems, Bridgestone Corporation of Japan has developed a technical solution for preparation of the s-PB with an iron-based catalyst using dialkyl phosphite [$HP(O)(OR)_2$] or cyclic phosphite as an electron donor, and with an aliphatic hydrocarbon as a solvent (European Patents EP0994129A1 and EP0994130A, US Patent US627779, and PCT Patent WO0149753A1). The dialkyl phosphite, as an intermediate in the preparation of pesticides, is easily decomposed in the presence of water to release toxic and harmful phosphorous oxide fumes and belongs to a transport-restricted chemical. Moreover, the s-PB thermoplastic elastomers form a pseudo-gel-like substance, and it is difficult for an antioxidant to be uniformly dispersed in a polymer, thereby causing gelation of the polymer.

In order to avoid the gelation, Chinese patent CN101434671A disclosed a preparation method of a thermostable s-PB thermoplastic elastomer using an iron(III) 2-ethylhexanoate/diester phosphite/trialkylaluminum system combined with 2,6-dihydrocarbyl-4-(dihydrocarbylaminomethyl)phenol as a catalyst. The iron-based catalyst has a high polymerization activity. However, s-PB elastomers prepared by the iron-based catalyst each have a melting point of 150° C. to 170° C., and this high melting point may result in an inability to mix with other rubbers uniformly. Moreover, the s-PB elastomers may also lead to gelation at a high temperature.

SUMMARY

An objective of the present disclosure is to provide a catalytic system and use thereof, and a preparation method of s-PB. The catalytic system can prepare the s-PB with a high activity at a high temperature, and the s-PB has a melting point of 60° C. to 130° C. with no gelation.

To achieve the above objective of the present disclosure, the present disclosure provides the following technical solutions.

The present disclosure provides a catalytic system, including an iron-containing organic compound, an azodicyano compound, an organoaluminum compound, and a free radical scavenger; where an iron element in the iron-containing organic compound, the azodicyano compound, the organoaluminum compound, and the free radical scavenger have a molar ratio of 1:(0.5-10):(5-100):(1-1000); and the free radical scavenger is selected from the group consisting of a sterically hindered phenol, a sterically hindered amine, and a phosphorus-containing antioxidant.

Preferably, the iron-containing organic compound includes an iron-containing carboxylate and/or an iron-containing complex.

Preferably, the iron-containing carboxylate is one or more selected from the group consisting of iron naphthenate, iron neodecanoate, and iron(III) 2-ethylhexanoate; and the iron-containing complex is iron acetylacetonate.

Preferably, the azodicyano compound is one or more selected from the group consisting of azobisisobutyronitrile (AIBN), 2,2'-azobis(2-methylbutyronitrile) (AMBN), 2,2'-azobis-(2,4-dimethylvaleronitrile) (ABVN), and 1,1'-azobis(cyclohexanecarbonitrile) (ACCN).

Preferably, the organoaluminum compound is one or more selected from the group consisting of tri ethyl aluminum (TEA), triisobutyl aluminum (TIBA), diisobutylaluminum hydride (DIBAH), and diisobutylaluminum chloride (DIBAC).

Preferably, the free radical scavenger is one or more selected from the group consisting of an antioxidant 2264, an antioxidant 264, an antioxidant 1010, an antioxidant 1076, an antioxidant THP24, an antioxidant 3010, an antioxidant 168, an antioxidant RD, an antioxidant 1024, an antioxidant 4010, an antioxidant 4020, and an antioxidant H.

The present disclosure further provides use of the catalytic system in preparation of s-PB.

The present disclosure further provides a preparation method of s-PB, including the following steps:

mixing a catalytic system with butadiene to conduct polymerization to obtain the s-PB; where the butadiene is in a form selected from the group consisting of a liquid butadiene bulk and a butadiene solution;

the butadiene solution has a hydrocarbon organic solvent; and the catalytic system is the catalytic system described in the above technical solution.

Preferably, the catalytic system has the iron element and the butadiene at a molar ratio of 1:(1000-100000).

The present disclosure provides a catalytic system, including an iron-containing organic compound, an azodicyano compound, an organoaluminum compound, and a free radical scavenger; where an iron element in the iron-containing organic compound, the azodicyano compound, the organoaluminum compound, and the free radical scavenger have a molar ratio of 1:(0.5-10):(5-100):(1-1000); and the free radical scavenger is selected from the group consisting of a sterically hindered phenol, a sterically hindered amine, and a phosphorus-containing antioxidant. In the present disclosure, the catalytic system adopts the non-toxic iron as a central metal of an active component, the azodicyano
} compound as a ligand, and the organoaluminum compound as a co-catalyst. The generation of free radicals in the system is weakened or even avoided by a free radical scavenging effect of the sterically hindered phenol, the sterically hindered amine, or the phosphorus-containing antioxidant. Therefore, the catalytic system can prepare the s-PB with a high activity at a high temperature, and the s-PB has a melting point of 60° C. to 130° C. with an extremely low gel content or even no gelation.

DETAILED DESCRIPTION OF THE EMBODIMENTS

The present disclosure provides a catalytic system, including an iron-containing organic compound (denoted as A), an azodicyano compound (denoted as B), an organoaluminum compound (denoted as C), and a free radical scavenger (denoted as D); where
an iron element in the iron-containing organic compound, the azodicyano compound, the organoaluminum compound, and the free radical scavenger have a molar ratio of 1:(0.5-10):(5-100):(1-1000); and
the free radical scavenger is selected from the group consisting of a sterically hindered phenol, a sterically hindered amine, and a phosphorus-containing antioxidant.

In the present disclosure, all components are commercially available products well known to those skilled in the art unless otherwise specified.

In the present disclosure, the iron-containing organic compound includes preferably an iron-containing carboxylate and/or an iron-containing complex, and the iron-containing carboxylate has preferably divalent iron or trivalent iron; the iron-containing carboxylate is preferably one or more selected from the group consisting of iron naphthenate, iron neodecanoate, and iron(III) 2-ethylhexanoate; the iron-containing complex is preferably iron acetylacetonate; and when the iron-containing organic compound is two or more of the above-mentioned specific selections, there is no special limitation on a proportion of the above-mentioned specific substances, and any proportion can be used.

In the present disclosure, the azodicyano compound is preferably one or more selected from the group consisting of AIBN, AMBN, ABVN, and ACCN; and when the azodicyano compound is two or more of the above-mentioned specific selections, there is no special limitation on a proportion of the above-mentioned specific substances, and any proportion can be used.

In the present disclosure, the organoaluminum compound is preferably one or more selected from the group consisting of TEA, TIBA, DIBAH, and DIBAC; and when the organoaluminum compound is two or more of the above-mentioned specific selections, there is no special limitation on a proportion of the above-mentioned specific substances, and any proportion can be used.

In the present disclosure, the free radical scavenger is preferably one or more selected from the group consisting of an antioxidant 2264, an antioxidant 264, an antioxidant 1010, an antioxidant 1076, an antioxidant THP24, an antioxidant 3010, an antioxidant 168, an antioxidant RD, an antioxidant 1024, an antioxidant 4010, an antioxidant 4020, and an antioxidant H; and when the free radical scavenger is two or more of the above-mentioned specific selections, there is no special limitation on a proportion of the above-mentioned specific substances, and any proportion can be used.

In the present disclosure, an iron element in the iron-containing organic compound, the azodicyano compound, the organoaluminum compound, and the free radical scavenger have a molar ratio of preferably 1:(0.5-10):(5-100):(1-1000), more preferably 1:(1-4):(10-50):(10-100), and most preferably 1:(2-3):(30-40):(30-60).

In the present disclosure, each component in the catalytic system is preferably packaged independently before use; and when applied, the components are mixed preferably in sequence.

The present disclosure further provides use of the catalytic system in preparation of s-PB.

The present disclosure further provides a preparation method of s-PB, including the following steps:
mixing a catalytic system with butadiene to conduct polymerization to obtain the s-PB; where
the butadiene is in a form selected from the group consisting of a liquid butadiene bulk and a butadiene solution;
the butadiene solution has a hydrocarbon organic solvent; and
the catalytic system is the catalytic system described in the above technical solution.

In the present disclosure, the butadiene is in a form selected from the group consisting of a liquid butadiene bulk and a butadiene solution; the butadiene solution has preferably a hydrocarbon organic solvent, more preferably an aliphatic hydrocarbon organic solvent or an aromatic hydrocarbon organic solvent; the aliphatic hydrocarbon organic solvent is preferably one or more selected from the group consisting of hexane, cyclohexane, pentane, heptane, and octane, more preferably the hexane and the cyclohexane; the aromatic hydrocarbon organic solvent is preferably one or more selected from the group consisting of benzene, toluene, and xylene; and when the hydrocarbon organic solvent is two or more of the above-mentioned specific selections, there is no special limitation on a proportion of the above-mentioned specific substances, and any proportion can be used.

In the present disclosure, the butadiene solution has the butadiene and the hydrocarbon organic solvent at a dosage ratio of preferably 1 g:8.4 mL.

In the present disclosure, the mixing is conducted preferably in a nitrogen atmosphere.

In the present disclosure, the catalytic system has the iron element and the butadiene at a molar ratio of preferably 1:(1000-100000), more preferably 1:(5000-50000), and most preferably 1:(10000-30000).

In the present disclosure, the mixing is conducted preferably by: adding each component in the catalytic system to the butadiene in any sequence, more preferably by: adding the A, the B, the C, and the D to the butadiene in an order of A, C, B, and D or in an order of A, C, D, and B; alternatively, two or more components in the catalytic system are mixed and aged, and then added to the butadiene.

In the present disclosure, the polymerization is conducted at preferably 30° C. to 150° C., more preferably 50° C. to 100° C. for preferably 0.1 h to 10 h, more preferably 0.5 h to 3 h.

In the present disclosure, after the polymerization is completed, the reaction is preferably terminated by an ethanol solution of HCl with a mass concentration of 1%.

In the present disclosure, after the reaction is terminated, filtration and vacuum drying are preferably conducted in sequence.

In the present disclosure, s-PB prepared by the preparation method is preferably used in manufacture of shoe soles, tire treads, sponges, or foamed tire treads.

The catalytic system and the use thereof, and the preparation method of s-PB provided by the present disclosure will be described in detail below with reference to examples, but these examples should not be construed as limiting the scope of the present disclosure.

Note: in the examples and comparative examples, a gel content is tested according to a standard of SH/T 1050-2014. In the tables, "-" means no test; [BD]/[Fe] represents the molar ratio of butadiene and iron; [Al]/[Fe] represents the molar ratio of Al and Fe; [OH]/[Al] represents the molar ratio of OH groups and Al in the free radical scavenger; and [P]/[Al] represents the molar ratio of P and Al in the antioxidant 3010.

Examples 1 to 6

Under a nitrogen atmosphere, a butadiene solution containing 84 mL of dry hexane and 10 g of dry butadiene was added to a single-neck reaction flask subjected to bake-drying; iron acetylacetonate, TIBA, AIBN, and an antioxidant 3010 were added in sequence (a dosage of each component was shown in Table 1), and a resulting mixture was subjected to polymerization in a constant-temperature water bath at 50° C. for 2 h; the reaction was terminated by an ethanol solution of HCl with a mass concentration of 1% and filtration was conducted; an obtained solid product was vacuum-dried at 60° C. to a constant weight, so as to obtain s-PB (relevant physicochemical parameters of the s-PB were shown in Table 1).

TABLE 1

Raw material dosage and physicochemical parameters of s-PB

| Ex. | Iron acetylacetonate (mmol) | AIBN (mmol) | TIBA (mmol) | Antioxidant 3010 (mmol) | [Al]/[Fe] | [P]/[Al] | Yield (%) | Melting point (° C.) | 1,2-structure content (%) | Crystallinity (%) | Gel content (%) |
|---|---|---|---|---|---|---|---|---|---|---|---|
| 1 | 0.0185 | 0.0093 | 0.093 | 0.047 | 5 | 1 | 3.6 | — | — | — | — |
| 2 | 0.0185 | 0.0185 | 0.37 | 0.185 | 20 | 1 | 76.3 | 130.6 | 58.6 | 6.3 | 0 |
| 3 | 0.0185 | 0.037 | 0.74 | 0.37 | 40 | 1 | 95.0 | 129.7 | 81.0 | 20.6 | 0 |
| 4 | 0.0185 | 0.093 | 0.37 | 0.185 | 20 | 1 | 99.0 | 72.3 | 64.5 | 2.3 | 0 |
| 5 | 0.0185 | 0.148 | 0.555 | 0.278 | 30 | 1 | 36.9 | — | — | — | — |
| 6 | 0.0185 | 0.185 | 0.37 | 0.185 | 20 | 1 | 16.3 | — | — | — | — |

Figure 2:
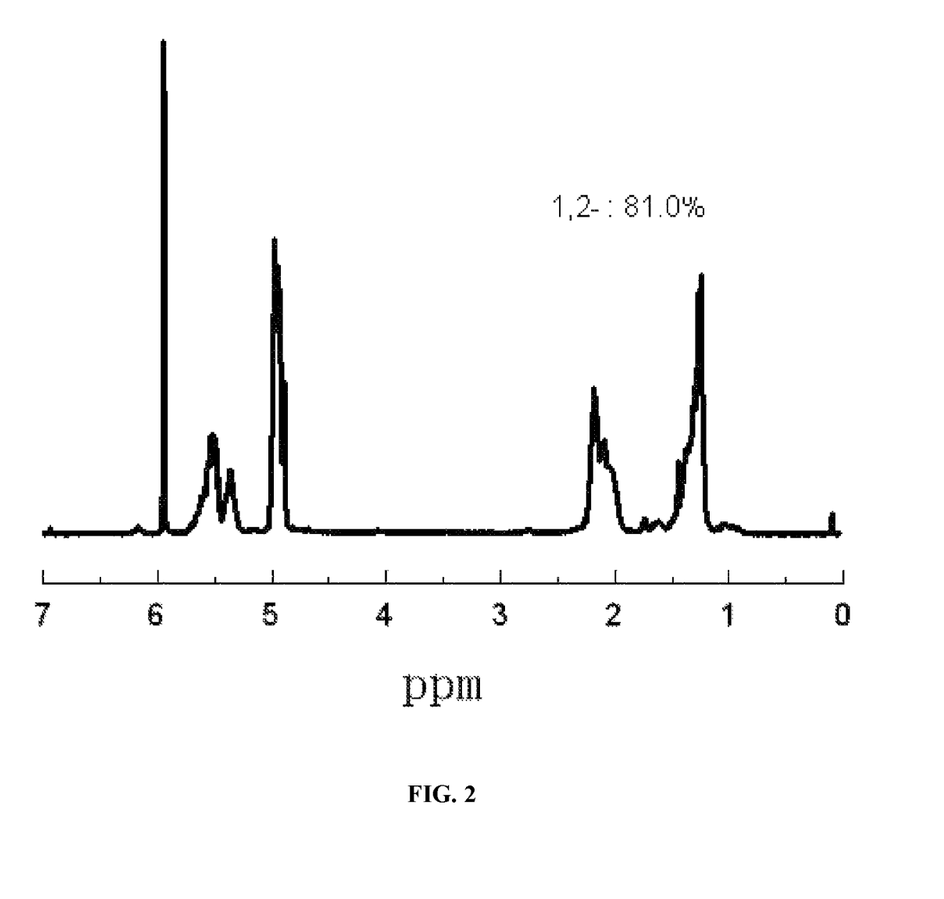
FIG. 2 shows a $^1$H NMR spectrum of s-PB in Example 3.
Figure 4:
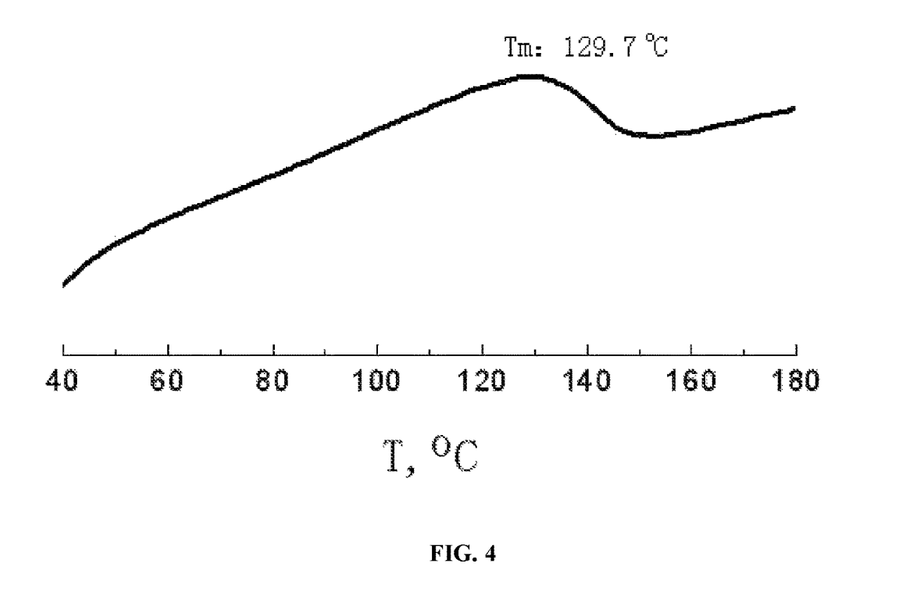
FIG. 4 shows a DSC chart of s-PB in Example 3.

Note:
[BD]/[Fe] = 10000;

FIG. 2 showed a $^1$NMR spectrum of the s-PB in Example 3. It was seen from FIG. 2 that the s-PB had a 1,2-structure content of 81%; and FIG. 4 showed a DSC chart of the s-PB in Example 3. It was seen from FIG. 4 that the s-PB had a melting point of 129.7° C.

Example 7

This example referred to Examples 1 to 6, and the difference was only that: after obtaining the butadiene solution, 0.185 mmol of iron(III) 2-ethylhexanoate, 3.7 mmol of TIBA, 0.185 mmol of an antioxidant 1076, and 0.37 mmol of AIBN were successively added to obtain 9.514 g of s-PB (with a yield of 95.14%, a melting point of 77.6° C., a 1,2-structure content of 64.6%, a crystallinity of 2.2%, and a gel content of 1.2%).

Examples 8 to 13

These examples referred to Example 7, the difference was that: compositions of the catalytic systems were different, and compositions of the catalytic systems in Examples 8 to 13 were shown in Table 2, and physicochemical parameters of the prepared s-PB were shown in Table 2:

TABLE 2

Raw material dosage and physicochemical parameters of s-PB

| Ex. | Iron acetylacetonate (mmol) | AIBN (mmol) | TIBA (mmol) | Free radical scavenger (mmol) | [BD]/[Fe] | Yield (%) | Melting point (° C.) | 1,2-structure content (%) | Crystallinity (%) | Gel content (%) |
|---|---|---|---|---|---|---|---|---|---|---|
| 8 | 0.093 | 0.185 | 1.85 | Antioxidant 264 (0.093) | 0.2 | 95.2 | 71.8 | 75.4 | 2.3 | 1.12 |

TABLE 2-continued

Raw material dosage and physicochemical parameters of s-PB

| Ex. | Iron acetylacetonate (mmol) | AIBN (mmol) | TIBA (mmol) | Free radical scavenger (mmol) | [BD]/[Fe] | Yield (%) | Melting point (° C.) | 1,2-structure content (%) | Crystallinity (%) | Gel content (%) |
|---|---|---|---|---|---|---|---|---|---|---|
| 9  | 0.037  | 0.074  | 0.74  | Antioxidant 1076 (0.037)    | 0.5 | 93.1 | 85.6  | 74.6 | 5.7 | 2.2 |
| 10 | 0.0185 | 0.037  | 0.37  | Antioxidant 2264 (0.0185)   | 1   | 87.3 | 88.4  | 69.4 | 5.2 | 0   |
| 11 | 0.0093 | 0.0185 | 0.185 | Antioxidant THP24 (0.0093)  | 2   | 73.3 | 113.1 | 64.3 | 4.6 | 0   |
| 12 | 0.0074 | 0.0074 | 0.144 | Antioxidant 168 (0.0074)    | 5   | 46.7 | —     | —    | —   | —   |
| 13 | 0.0037 | 0.0037 | 0.074 | Antioxidant 1024 (0.0037)   | 10  | 17.1 | —     | —    | —   | —   |

Figure 6:
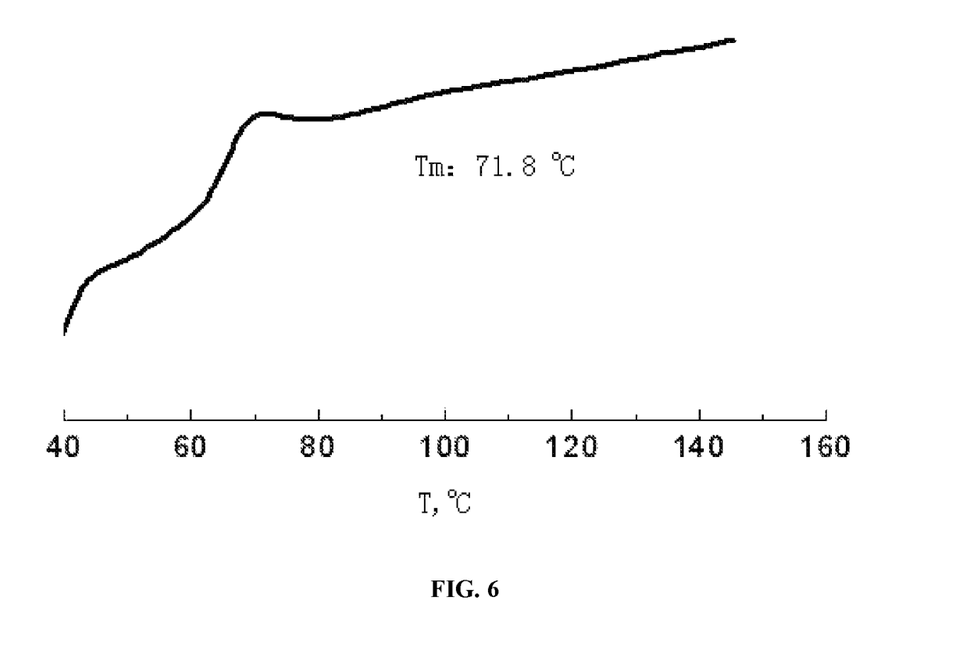
FIG. 6 shows a DSC chart of s-PB in Example 8.

Note:

[Al]/[Fe] = 20:1;

FIG. 6 showed a DSC chart of the s-PB in Example 8. As was seen from FIG. 6, the s-PB had a melting point of 71.8° C.

Examples 14 to 18

These examples referred to Examples 1 to 6, and the difference was that: after obtaining the butadiene solution, iron naphthenate, TIBA, an antioxidant 1010 ([OH]/[Al]=1:1), and AIBN were added in sequence to obtain s-PB; physicochemical parameters of the s-PB were shown in Table 3:

TABLE 3

Raw material dosage and physicochemical parameters of s-PB

| Ex. | Iron acetylacetonate (mmol) | AIBN (mmol) | TIBA (mmol) | [OH] (mmol) | [AL]/[Fe] | Yield (%) | Melting point (° C.) | 1,2-structure content (%) | Crystallinity (%) | Gel content (%) |
|---|---|---|---|---|---|---|---|---|---|---|
| 14 | 0.0185 | 0.037 | 0.185 | 0.185 | 10  | 31.0 | —     | —    | —   | —   |
| 15 | 0.0185 | 0.037 | 0.37  | 0.37  | 20  | 82.5 | 91.4  | 57.7 | 3.0 | 1.3 |
| 16 | 0.0185 | 0.037 | 0.555 | 0.555 | 30  | 82.7 | 93.6  | 64.3 | 5.1 | 2.0 |
| 17 | 0.0185 | 0.037 | 1.11  | 1.11  | 60  | 89.2 | 103.2 | 71.4 | 5.7 | 2.2 |
| 18 | 0.0185 | 0.037 | 1.85  | 1.85  | 100 | 93.2 | 104.1 | 71.6 | 7.8 | 3.6 |

Figure 3:
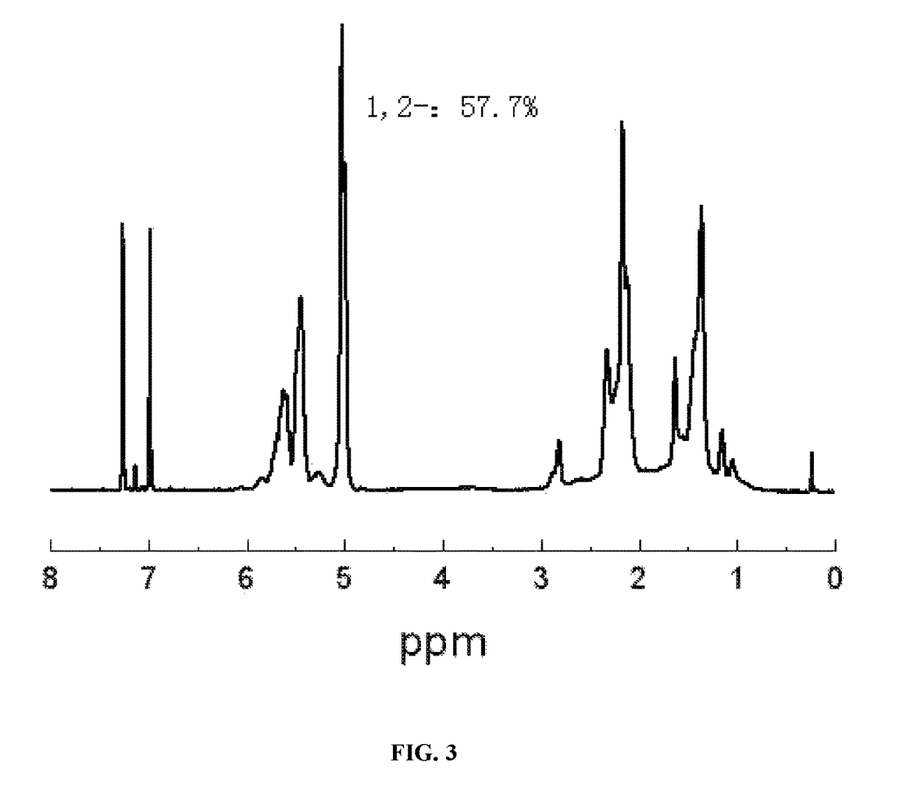
FIG. 3 shows a $^1$H NMR spectrum of s-PB in Example 15.

Note:

[BD]/[Fe] = 10000;

antioxidant 1010 ([OH]/[Al] = 1:1);

FIG. 3 showed a $^1$H NMR chart of the s-PB in Example 15. As was seen from FIG. 3, the s-PB had a microscopic 1,2-structure content of 57.7%.

Example 19

This example referred to Examples 1 to 6, and the difference was that: after obtaining the butadiene solution, 0.185 mmol of iron neodecanoate, 0.37 mmol of TEA, 18.5 mmol of an antioxidant 1076, and 0.37 mmol of ABVN were sequentially added to obtain 5.7 g of s-PB (with a yield of 57%, a melting point of 97.6° C., a 1,2-structure content of 65.4%, a crystallinity of 2.7%, and a gel content of 0).

Example 20

This example referred to Examples 1 to 6, and the difference was that: after obtaining the butadiene solution, 0.0185 mmol of iron(III) 2-ethylhexanoate, 0.37 mmol of DIBAH, 0.0185 mmol of an antioxidant 1076, and 0.037 mmol of ACCN were sequentially added to obtain 8.7 g of s-PB (with a yield of 87%, a melting point of 94.3° C., a 1,2-structure content of 55.4%, a crystallinity of 2.1%, and a gel content of 0).

Examples 21 to 24

Under a nitrogen atmosphere, a toluene solution of 2 g/20 mL butadiene was added to a single-neck reaction flask subjected to bake-drying; 0.0037 mmol of iron(III) 2-ethylhexanoate, 0.074 mmol of TIBA, 0.0074 mmol of AIBN, and 0.0037 mmol of a free radical scavenger (types of the free radical scavenger were shown in Table 4) were added in sequence, and a resulting mixture was subjected to polymerization in a constant-temperature water bath at 90° C. for 4 h; the reaction was terminated by an ethanol solution of HCl with a mass concentration of 1% and filtration was conducted; an obtained solid product was vacuum-dried at 60° C. to a constant weight, so as to obtain s-PB (relevant physicochemical parameters of the s-PB were shown in Table 4).

TABLE 4

Types of sterically hindered amines and physicochemical parameters of s-PB

| Ex. | Types of free radical scavenger | [Al]/[Fe] | [NH]/[Fe] | Yield (%) | Melting point (° C.) | 1,2-structure content (%) | Crystallinity (%) | Gel content (%) |
|---|---|---|---|---|---|---|---|---|
| 21 | Antioxidant RD | 20 | 1 | 93.6 | 110.6 | 67.5 | 2.3 | 0 |
| 22 | Antioxidant 4020 | 20 | 2 | 50.7 | 121.3 | 55.6 | 3.2 | 0 |
| 23 | Antioxidant 4010 | 20 | 2 | 77.5 | 123.4 | 62.3 | 3.7 | 0 |
| 24 | Antioxidant H | 20 | 2 | 33.6 | 127.1 | 68.4 | 4.4 | 0 |

Note:
[BD]/[Fe] = 10000;

Example 25

Figure 1:
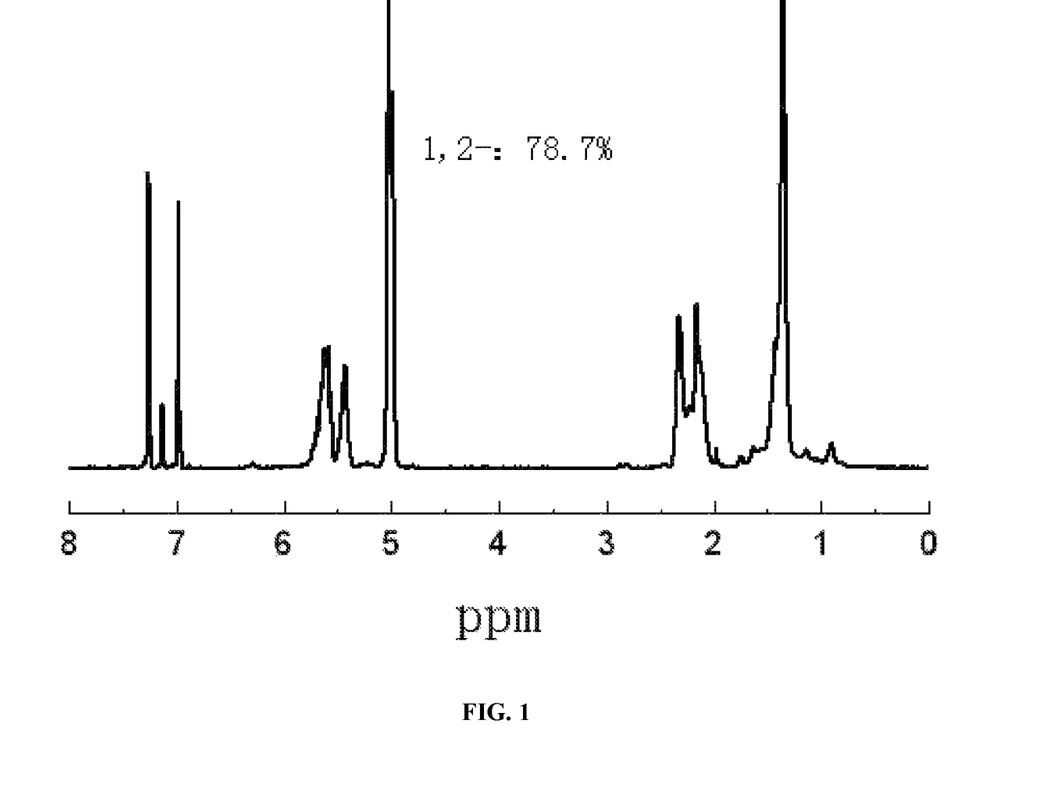
FIG. 1 shows a $^1$H NMR spectrum of s-PB in Example 25.
Figure 5:
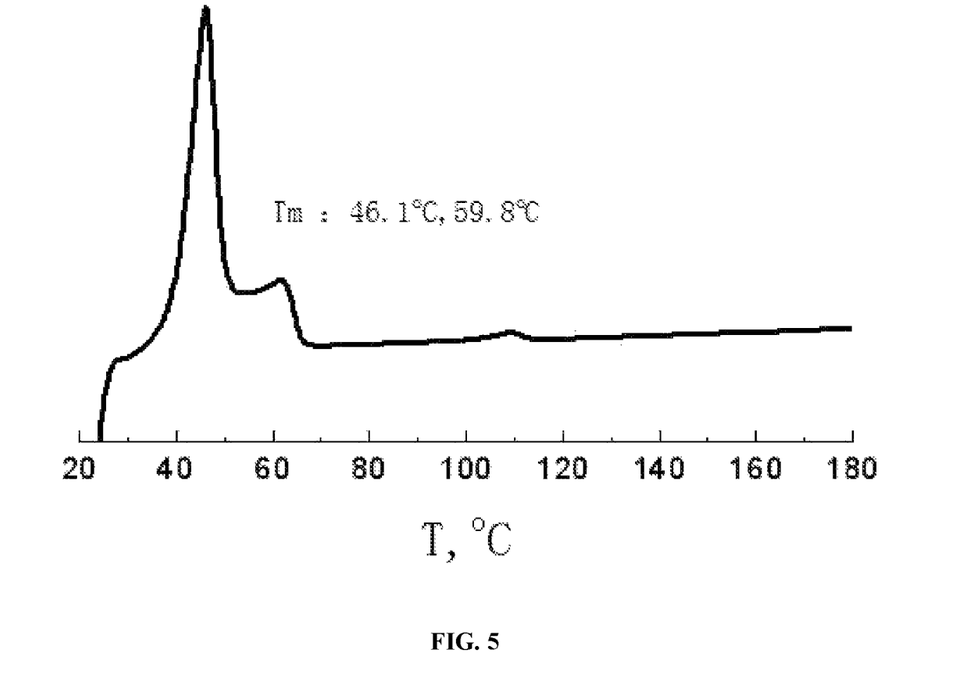
FIG. 5 shows a DSC chart of s-PB in Example 25.

This example referred to Examples 1 to 6, and the difference was that: after obtaining the butadiene solution, 0.0185 mmol of iron(III) 2-ethylhexanoate, 0.37 mmol of DIBAC, and 0.037 mmol of AIBN were added sequentially; a mixture was heated in a constant-temperature water bath at 70° C. for 10 min, added with 0.0185 mmol of an antioxidant 168, and subjected to polymerization in a constant-temperature water bath at 70° C. for 4 h to obtain 6.4 g of s-PB (with a yield of 64.0%, a melting point of 46.1° C. and 59.8° C. (FIG. 5), a 1,2-structure content of 78.7% (FIG. 1), and a gel content of 0.5%).

Comparative Example 1

Under a nitrogen atmosphere, a butadiene solution containing 84 mL of dry hexane and 10 g of dry butadiene was added to a single-neck reaction flask subjected to bake-drying; 0.0185 mmol of iron(III) 2-ethylhexanoate, 0.37 mmol of TIBA, and 0.037 mmol of AIBN were added in sequence, and a resulting mixture was subjected to polymerization in a constant-temperature water bath at 50° C. for 2 h; the reaction was terminated by an ethanol solution of HCl with a mass concentration of 1%, and filtration and drying were conducted; an obtained solid product was vacuum-dried at 60° C. to a constant weight, so as to obtain 9.95 g of s-PB (with a yield of 99.50% and a gel content of 78.2%).

Comparative Examples 2 to 4

These examples referred to Comparative Example 1, the difference was that: different types of azodicyano compounds were used, as shown in Table 5:

TABLE 5

Types of azodicyano compounds and physicochemical parameters of s-PB in Comparative Examples 2 to 4

| Ex. | Types of azodicyano compounds | [Al]/[Fe] | [CN]/[Fe] | Yield (%) | Melting point (° C.) | 1,2-structure content (%) | Crystallinity (%) | Gel content (%) |
|---|---|---|---|---|---|---|---|---|
| Comp. Ex. 2 | AMBN | 20 | 2 | 93.6 | 123.6 | 67.5 | 2.3 | 65.2 |
| Comp. Ex. 3 | ABVN | 20 | 2 | 90.7 | 121.3 | 58.6 | 3.2 | 57.2 |
| Comp. Ex. 4 | ACCN | 20 | 2 | 87.5 | 123.4 | 62.3 | 3.7 | 52.1 |

The above descriptions are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure.

What is claimed is:

1. A catalytic system comprising:
   an iron-containing organic compound, an azodicyano compound, an organoaluminum compound, and a free radical scavenger; wherein:
   an iron element in the iron-containing organic compound, the azodicyano compound, the organoaluminum compound, and the free radical scavenger have a molar ratio of 1:(0.5-10):(5-100): (1-1000); and
   the free radical scavenger is selected from the group consisting of a sterically hindered phenol, a sterically hindered amine, and a phosphorus-containing antioxidant.

2. The catalytic system according to claim 1, wherein the iron-containing organic compound comprises an iron-containing carboxylate and/or an iron-containing complex.

3. The catalytic system according to claim 2, wherein the iron-containing carboxylate is one or more selected from the group consisting of iron naphthenate, iron neodecanoate, and iron(III) 2-ethylhexanoate; and
   the iron-containing complex is iron acetylacetonate.

4. The catalytic system according to claim 1, wherein the azodicyano compound is one or more selected from the group consisting of azobisisobutyronitrile (AIBN), 2,2'-azobis(2-methylbutyronitrile) (AMBN), 2,2'-azobis-(2,4-dimethylvaleronitrile) (ABVN), and 1,1'-azobis(cyclohexanecarbonitrile) (ACCN).

5. The catalytic system according to claim 1, wherein the organoaluminum compound is one or more selected from the group consisting of triethylaluminum (TEA), triisobutylaluminum (TIBA), diisobutylaluminum hydride (DIBAH), and diisobutylaluminum chloride (DIBAC).

6. A preparation method of s-PB, the method comprising the following steps:
   mixing a catalytic system with butadiene to conduct polymerization to obtain the s-PB;
   wherein:
   the butadiene is in a form selected from the group consisting of a liquid butadiene bulk and a butadiene solution;

the butadiene solution has a hydrocarbon organic solvent; and the catalytic system comprises:
  an iron-containing organic compound, an azodicyano compound, an organoaluminum compound, and a free radical scavenger; wherein:
an iron element in the iron-containing organic compound, the azodicyano compound, the organoaluminum compound, and the free radical scavenger have a molar ratio of 1:(0.5-10):(5-100): (1-1000); and
the free radical scavenger is selected from the group consisting of a sterically hindered phenol, a sterically hindered amine, and a phosphorus-containing antioxidant.

7. The preparation method according to claim 6, wherein the catalytic system has the iron element and the butadiene at a molar ratio of 1:(1000-100000).

8. The preparation method according to claim 6, wherein the iron-containing organic compound comprises an iron-containing carboxylate and/or an iron-containing complex.

9. The preparation method according to claim 8, wherein the iron-containing carboxylate is one or more selected from the group consisting of iron naphthenate, iron neodecanoate, and iron(III) 2-ethylhexanoate; and
the iron-containing complex is iron acetylacetonate.

10. The preparation method according to claim 6, wherein the azodicyano compound is one or more selected from the group consisting of azobisisobutyronitrile (AIBN), 2,2'-azobis(2-methylbutyronitrile) (AMBN), 2,2'-azobis-(2,4-dimethylvaleronitrile) (ABVN), and 1,1'-azobis(cyclohexanecarbonitrile) (ACCN).

11. The preparation method according to claim 6, wherein the organoaluminum compound is one or more selected from the group consisting of triethylaluminum (TEA), triisobutylaluminum (TIBA), diisobutylaluminum hydride (DIBAH), and diisobutylaluminum chloride (DIBAC).

12. The preparation method according to claim 8, wherein the catalytic system has the iron element and the butadiene at a molar ratio of 1:(1000-100000).

13. The preparation method according to claim 9, wherein the catalytic system has the iron element and the butadiene at a molar ratio of 1:(1000-100000).

14. The preparation method according to claim 10, wherein the catalytic system has the iron element and the butadiene at a molar ratio of 1:(1000-100000).

15. The preparation method according to claim 11, wherein the catalytic system has the iron element and the butadiene at a molar ratio of 1:(1000-100000).

* * * * *